United States Patent

[11] 3,601,674

| [72] | Inventors | John A. Joslyn<br>Dalton;<br>Albert F. Koch, Lanesboro, both of, Mass. |
|---|---|---|
| [21] | Appl. No. | 8,928 |
| [22] | Filed | Feb. 5, 1970 |
| [45] | Patented | Aug. 24, 1971 |
| [73] | Assignee | General Electric Company |

[54] CONTROL SYSTEM FOR FIRING SCR'S IN POWER CONVERSION APPARATUS
16 Claims, 7 Drawing Figs.

[52] U.S. Cl.............................................. 318/318,
318/329, 323/24
[51] Int. Cl............................................... H02p 5/06
[50] Field of Search.................................... 318/314,
318, 630, 329, 341, 195, 345, 3, 43, 8; 321/16, 52;
323/22 SCR, 24, 25, 146.2; 235/177, 168;
340/146.2; 307/222, 223, 252, 70

[56] References Cited
UNITED STATES PATENTS

| 2,537,427 | 1/1951 | Seid et al. | 318/630 |
| 3,196,262 | 7/1965 | Thompson | 340/146.2 X |
| 3,249,838 | 5/1966 | Mierendorf | 318/257 |
| 3,431,479 | 3/1969 | Joslyn | 318/257 |
| 3,491,283 | 1/1970 | Johnston | 323/4 |

Primary Examiner—Oris L. Rader
Assistant Examiner—Robert J. Hickey
Attorneys—James C. Davis, Jr., Edward W. Goebel, Jr., Frank L. Neuhauser, Oscar B. Waddell and Joseph B. Forman ABSTRACT: A digital control system for controlling the flow of power via SCR's from a multiphase AC source to a load. A digital command signal is compared with a digital feedback signal indicative of motor speed so as to generate a digital error signal. The system includes a digital firing circuit for each phase wherein each firing circuit comprises a reversible counter and a digital comparator. Phase detection logic examines the three phases of the AC source so as to synchronously initiate a control interval for an appropriate SCR by presetting a predetermined positive or negative digital number into the reversible counter associated with each phase. The reversible counter thereafter counts down if the present number is positive, or up if the preset number is negative, during the control interval. Continuous comparison of the digital error signal with the contents of the reversible counter is made by the digital comparator: when the error signal exceeds the contents of the reversible counter, a firing pulse is generated which is supplied to a positively poled SCR if the preset number is positive: when the contents of the reversible counter exceed the error signal, a firing pulse is generated which is supplied to a negatively poled SCR if the preset number is negative.

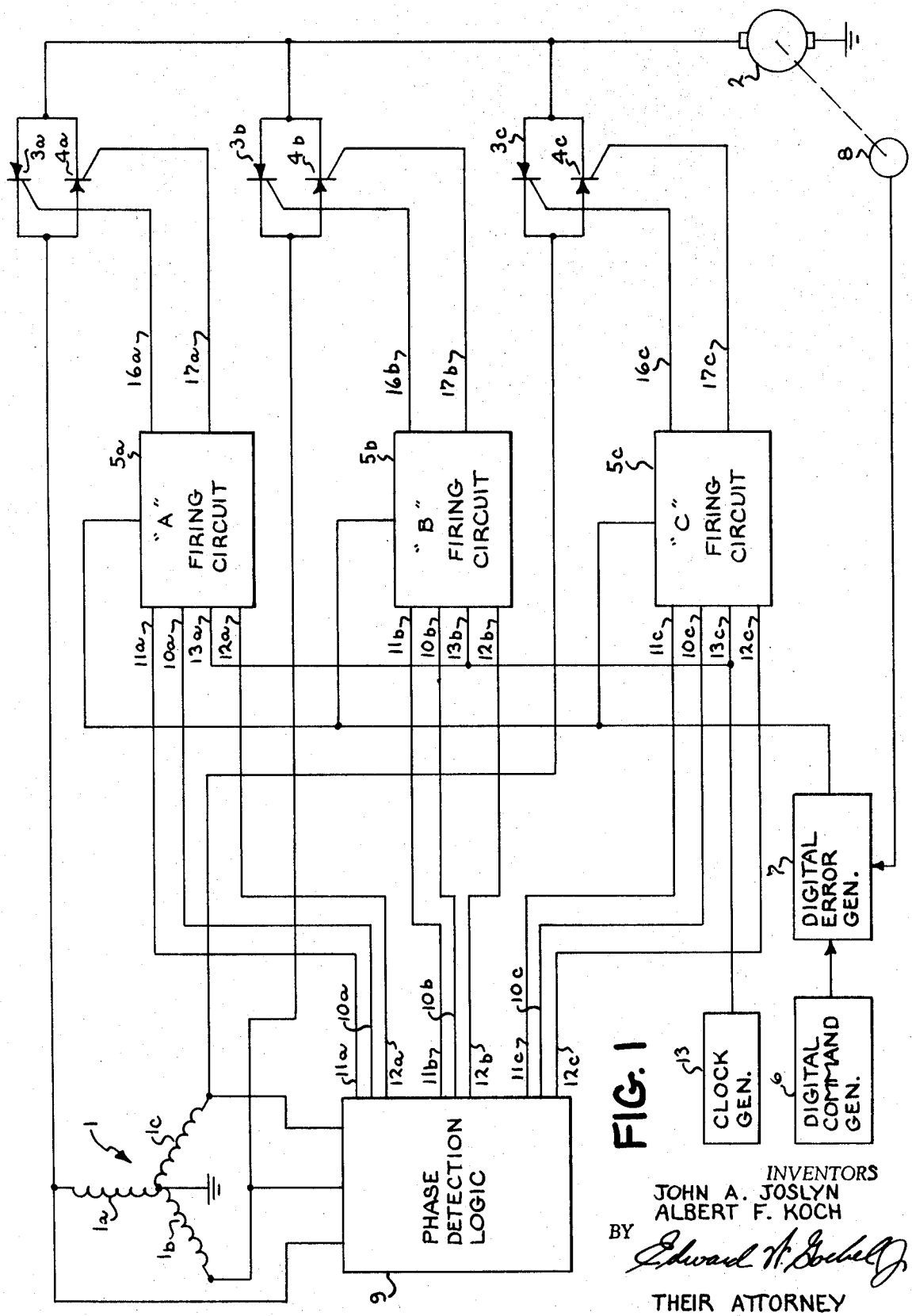

3,601,674

CONTROL SYSTEM FOR FIRING SCR'S IN POWER CONVERSION APPARATUS

BACKGROUND OF THE INVENTION

The present invention relates to a digital firing technique and to the apparatus utilizing such a technique for controlling the flow of power from an AC source to a load. More specifically, the present invention relates to a digital control system for controlling the conduction of controllable rectifiers placed between an AC source and a load. This invention relates to the system disclosed in patent application Ser. No. 8,927, filed concurrently herewith, entitled "DIGITAL POWER AMPLIFIER," and assigned to the same assignee as this invention, which patent application is herein incorporated by reference.

Motor control systems of the type described above now often use power amplifiers in which controlled rectifiers vary the flow of electrical energy between an alternating current source and a drive motor. By controlled rectifiers is meant a family of devices which present a relatively high blocking impedance to the flow of electrical energy until these controlled rectifiers are forward biased and simultaneously have firing signals applied to a gate electrode. At this time, the controlled rectifiers provide a very low impedance to the flow of current and normally continue to conduct current until they are back biased and/or the level of the current flowing through them is decreased to below a minimum holding current level necessary to keep these controlled rectifiers conducting. Controlled rectifiers include semiconductor devices such as silicon-controlled rectifiers and tube devices such as ignitrons and thyratrons. The amount of power transferred to the system load is controlled by varying the duration of conduction of the controllable rectifiers. The duration of conduction of the controllable rectifiers is a function of the point during the AC waveform at which they are initiated into conduction. This point is referred to as the firing angle.

Control of the firing angle of controllable rectifiers is carried out by circuitry referred to generally as firing circuits. Such firing circuits act in response to an input signal, indicative of desired power, to generate a firing pulse at the appropriate firing angle. Generally speaking, the firing angle is directly proportional to the input signal.

Firing circuits of the prior art have generally been of the analog type, operating in response to an input signal whose magnitude indicates the desired firing angle. Such firing circuits are consistent with prior art systems which have been primarily analog in operation.

With the development of digital techniques and hardware, it is becoming increasingly desirable to utilize digital circuitry in such control systems. This is particularly true where the system requires that degree of accuracy, reliability, or drift free operation which is achievable only with digital circuitry. Hence, it is becoming fairly common to replace elements of an analog system with functionally equivalent digital circuitry.

In systems which utilize controllable rectifiers to control the flow of power from an AC source to a load, digital circuitry has been used to generate the system command signals and to perform the necessary arithmetic operations to derive the input signal for controlling the conduction of the controllable rectifiers. This signal, in digital form, is then converted to an analog signal for use with conventional analog firing circuits. This practice, however, results in some inherent sacrifice of the reliability which is available in an all digital control system.

SUMMARY OF THE INVENTION

It is an object of the present invention to provide an all digital control system which continuously monitors signals indicative of actual characteristics of a load while controlling the flow of power from an AC source to a load.

It is a further object of this invention to provide an all digital control system which controls the conduction of controllable rectifiers in response to continuously monitored results of the conduction of these controllable rectifiers.

It is a further object of this invention to provide an improved digital firing circuit for controllable rectifiers which provides firing signals in response to continuously monitored characteristics of a load for the controllable rectifiers.

It is still another object of this invention to provide an improved method of transferring power from an AC source to a load which enables all digital control circuits to be used in continuously monitoring actual characteristics of a load receiving the power.

Briefly stated, the present invention operates to generate a digital error signal which is used to directly control the conduction of controllable rectifiers without first converting the signal to an analog voltage. Phase detection logic causes a preset positive or negative number to be entered into a reversible counter at the earliest point in the phase waveform at which the controllable rectifiers can be fired. The reversible counter thereafter counts either up or down from this preset number towards zero count. The contents of the reversible counter are continuously compared with the digital error signal in a comparator which causes a firing pulse to be supplied to at least one of the controllable rectifiers when the changing contents of the reversible counter becomes equal to or in excess of the digital error signal.

DESCRIPTION OF THE DRAWINGS

The subject matter of this invention is particularly pointed out and distinctly claimed in the concluding portion of the application. The invention both as to organization and method of operation may best be understood by reference to the following description taken in conjunction with the accompanying drawings in which:

FIG. 1 is a block diagram of a system which is a preferred embodiment of the invention;

DESCRIPTION OF THE PREFERRED EMBODIMENT

Figure 2A:
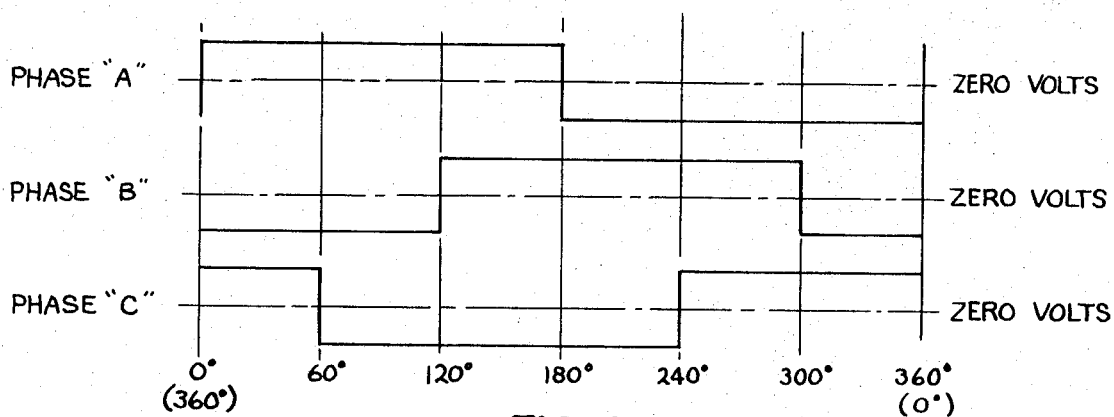
FIG. 2a is a timing diagram illustrating the time relationship of the three-phase AC input and FIG. 2b illustrates the operation of the phase detection logic shown in FIGS. 1 and 3.

FIG. 1 shows a block diagram of a control system embodying the present invention. Power is transferred from an AC source such as the three-phase transformer indicated generally at 1 to a load such as the DC motor 2 by a plurality of sets of oppositely poled controllable rectifiers such as the SCR's 3a, 3b, 3c, 4a, 4b, 4c. The SCR's are initiated into conduction by firing circuits such as 5a, 5b, and 5c which act to generate a firing pulse for the appropriate SCR at the desired time during the AC waveform.

The system of FIG. 1 is a digital control system and operates in response to a command signal in digital form as generated by a digital command generator 6. The precise form of digital command signal is not important for the purpose of the present invention. It may comprise, for example, a pulse train whose frequency is indicative of the desired motor speed or, alternatively, a digital number whose magnitude is indicative of the desired speed. In addition, the particular form of the digital command generator 6 is not important for the purposes of the present invention but may comprise, for example, a pulse rate multiplier or other variable frequency generator in the case where the output is a variable frequency pulse train. Similarly, if the output is a digital number, any of several well-known methods of generating a multibit digital code will suffice for the digital command generator 6.

The output of the digital command generator 6 is a first input to a digital error generator 7. The other input to the digital error generator 7 comes from a feedback device 8 which is coupled and driven by the motor 2. The feedback device 8 may comprise, for example, a simple pulse generator whose output frequency is proportional to the speed of the motor being controlled. The purpose of digital error generator 7 is to compare the digital command from the digital command generator 6 to the output of the feedback device 8 and to generate a resultant error signal for initiating the conduction of the controllable rectifiers interposed between the AC source 1 and the motor 2. For the purposes of the present invention, the digital error generator 7 is shown as having one output signal which is referred to in this specification as an error signal and which is preferably taken from a digital counter or register within error generator 7. The form or coding of the error signal is important only insofar as it must be compatible with the digital signals utilized in firing circuits 5a, 5b and 5c hereinafter to be described.

These firing circuits are digital in form and are adapted to accept the output of the digital error generator 7 and generate a firing pulse for an appropriate SCR in response to the magnitude and sense of the digital error. It is necessary to establish a control interval for each SCR in order that conduction thereof may be initiated by the digital error signal at a point in the excitation cycle when the appropriate SCR is desired to conduct. This timing is controlled by means of a phase detection logic circuit 9 which has its inputs connected to the three phases of the AC power source 1. As will be pointed out in detail hereinafter, the system will provide for the conduction of the SCR's connected to a particular phase of the AC source during particular times. The control of this timing is established by the phase detection logic 9 which generates signals on its outputs 10a, 10b and 10c to initiate and terminate the control intervals for the appropriate firing circuit. The phase detection logic 9 also supplies output signals on its outputs 11a, 11b and 11c, and outputs 12a, 12b and 12c which set reversible counters, hereinafter to be described, in the firing circuits 5a, 5b and 5c to either a positive or a negative digital number. The signals on outputs 10a, 10b and 10c from phase detection logic 9 also determine whether a positively or negatively poled SCR of a given phase is to be fired during the control interval, and fix the direction of counting of the aforesaid reversible counters from the preset digital numbers.

Broadly stated, then, the purpose of the phase detection logic 9 is to sense the earliest point during each half-cycle of the AC input wave at which a firing pulse can be generated, and then to define a control interval in which a continuous running comparison between the digital error signal and the changing contents of the reversible counter is maintained. In defining the control interval, phase detection logic 9 selects the SCR which is to be fired and conditions the appropriate firing circuit so that the selected SCR may be fired linearly with respect to the magnitude and sense of the digital error signal.

Having loaded either a positive or a negative preset number into the firing circuit, it is then necessary to act on that number to generate an appropriately timed firing pulse. The timing of this firing pulse is controlled by a clock generator 13 which feeds to terminals 13a, 13b and 13c in each of the firing circuits 5a, 5b and 5c, respectively In the particular embodiment to be hereinafter described, each of the firing circuits includes a reversible counter which accepts the preset number on command from the phase detection logic 9. The reversible counter contents, then, is counted in a direction from that preset number as determined by the sense of the signals on output terminals 10a, 10b and 10c, until the contents of the reversible counter changes to the extent that it equals or exceeds the error signal. A digital comparator is provided in each firing circuit to sense this change and to provide a firing signal for the appropriate SCR at the time of this occurrence. This operation will be explained in greater detail in the course of the discussion of the specific firing circuit illustrated in FIGS. 4 and 6.

Briefly, the operation of the system shown in FIG. 1 can be defined in terms of the following steps:

1. The output of the digital command generator 6 is compared with the output of the feedback device 8 in the digital error generator 7 to produce a digital error signal.

2. The phase detection logic 9 examines the three AC waveforms from transformer windings 1a, 1b and 1c which are connected to its input terminals and generates signals on its outputs 10a, 11a, 12a, etc., when a control interval is to be established for a particular firing circuit. These output signals preset a digital number into a reversible counter of the firing circuit, control the direction of counting thereof, and operate to choose the particular SCR to which a firing pulse is to be supplied.

3. Thereafter, the contents of the reversible counter are counted from the preset number by the output of clock generator 13 at a rate determined by the frequency thereof. Continuous comparison of the digital error signal with the contents of the reversible counter is made by a digital comparator in the firing circuit.

4. When the changing contents of the reversible counter equals or exceeds well-digital error signal, the firing circuit provides an output pulse on either its output 16, if one of the negatively poled SCR's 3 is to be energized or on its output 17, if one of the positively poled SCR's 4 is to be energized. This change in counter contents with respect to the error signal may conveniently be a change in the sign of the difference between those digital values which can be detected by a difference comparator hereinafter to be described.

Turning now to FIG. 2(a), there is shown, in square waveform, the well known relationship between the phases of an AC source such as source 1 of FIG. 1. As was seen in the description of FIG. 1, there are two SCR's connected to each phase of the AC source 1. These SCR's are oppositely poled so as to conduct current in opposite directions. By way of example, SCR's 3a and 4a are connected to the A phase of AC source 1 through winding 1a. In any control system of this type, it is necessary to determine the particular portion of the AC waveform during which a particular SCR can be permitted to conduct.

One method of controlling the conduction of the SCR's is to permit a positively poled SCR to conduct during the entire portion of the AC waveform in which its polarity is positive and to permit the negatively poled SCR to conduct during the entire negative portion of the AC waveform. Therefore, SCR 4a might be permitted to conduct during the positive portion of the AC waveform on the A phase, i.e., from 0° to 180°. Similarly, SCR 3a would be permitted to conduct from 180° to 360°. In such a system the control interval would be established by the output of phase detection logic at 0° and at 180°, and firing pulses would be produced by comparison of the preset number to the digital error signal in the "A" firing circuit starting at 0° and again at 180°.

Certain systems, however, require that the control interval be other than synchronous with the input AC waveform. For example, it may be desired to allow a particularly poled SCR to conduct only during a limited portion of its associated AC input. In the present embodiment, it is desired to allow each SCR to conduct only during the last 120° of its appropriately polarized, associated AC input, plus 60° into the opposite half of the applied voltage of its phase to allow for dynamic motor braking. Thus, SCR 4a will be allowed to conduct from 60° to 240° while SCR 3a will be allowed to conduct from 240° to 60°. Similarly, SCR 4b can conduct from 180° to 360° and SCR 3b from 0° to 180°. Finally, SCR 4c can conduct from 300° to 120° and SCR 3c from 120° to 300°. Therefore, phase detection logic 9 must generate output signals on its terminals 10a, 11a, 12a, etc., to define these control intervals.

Figure 3:
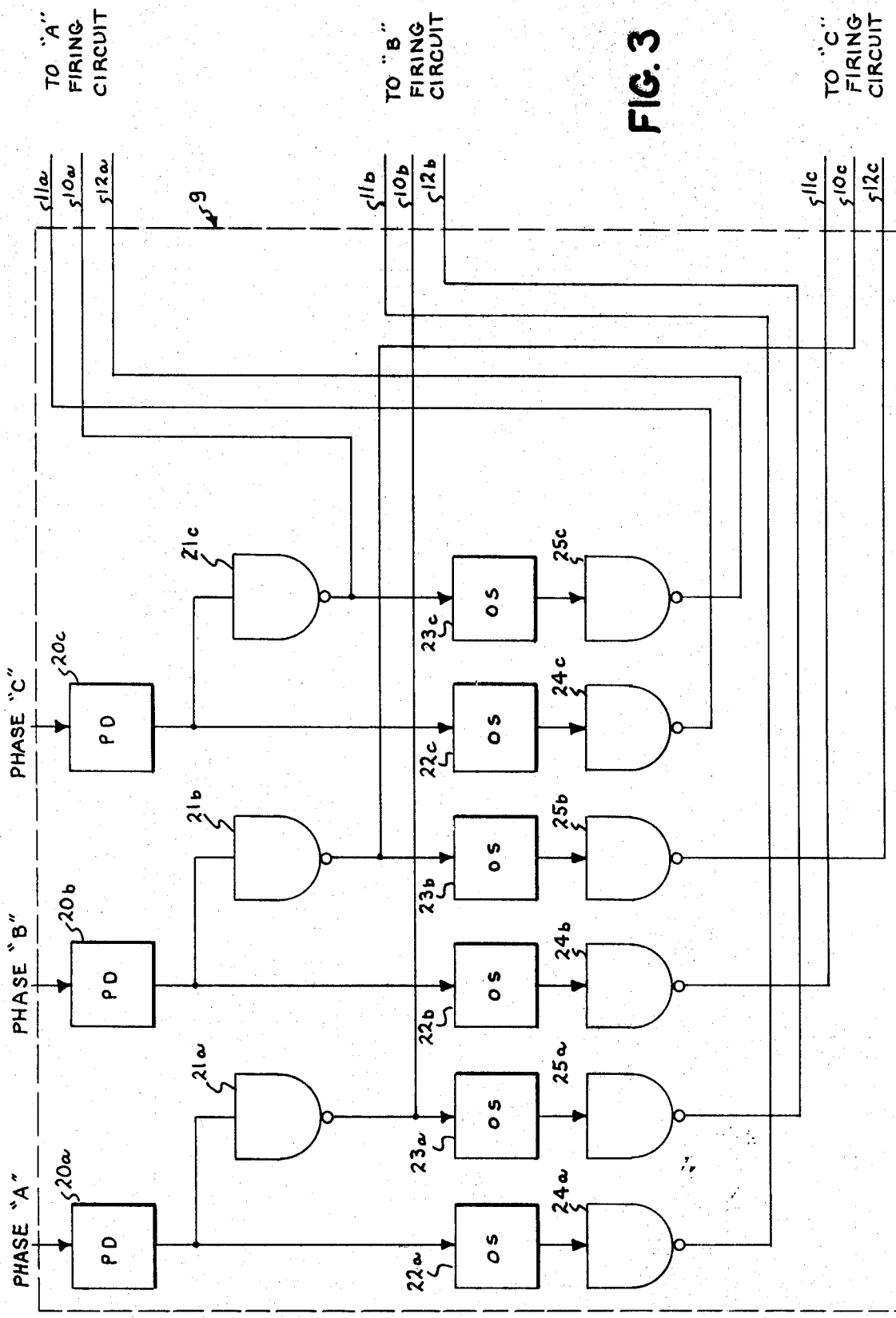
FIG. 3 is a detailed diagram of the phase detection logic shown in block form in FIG. 1.
Figure 4:
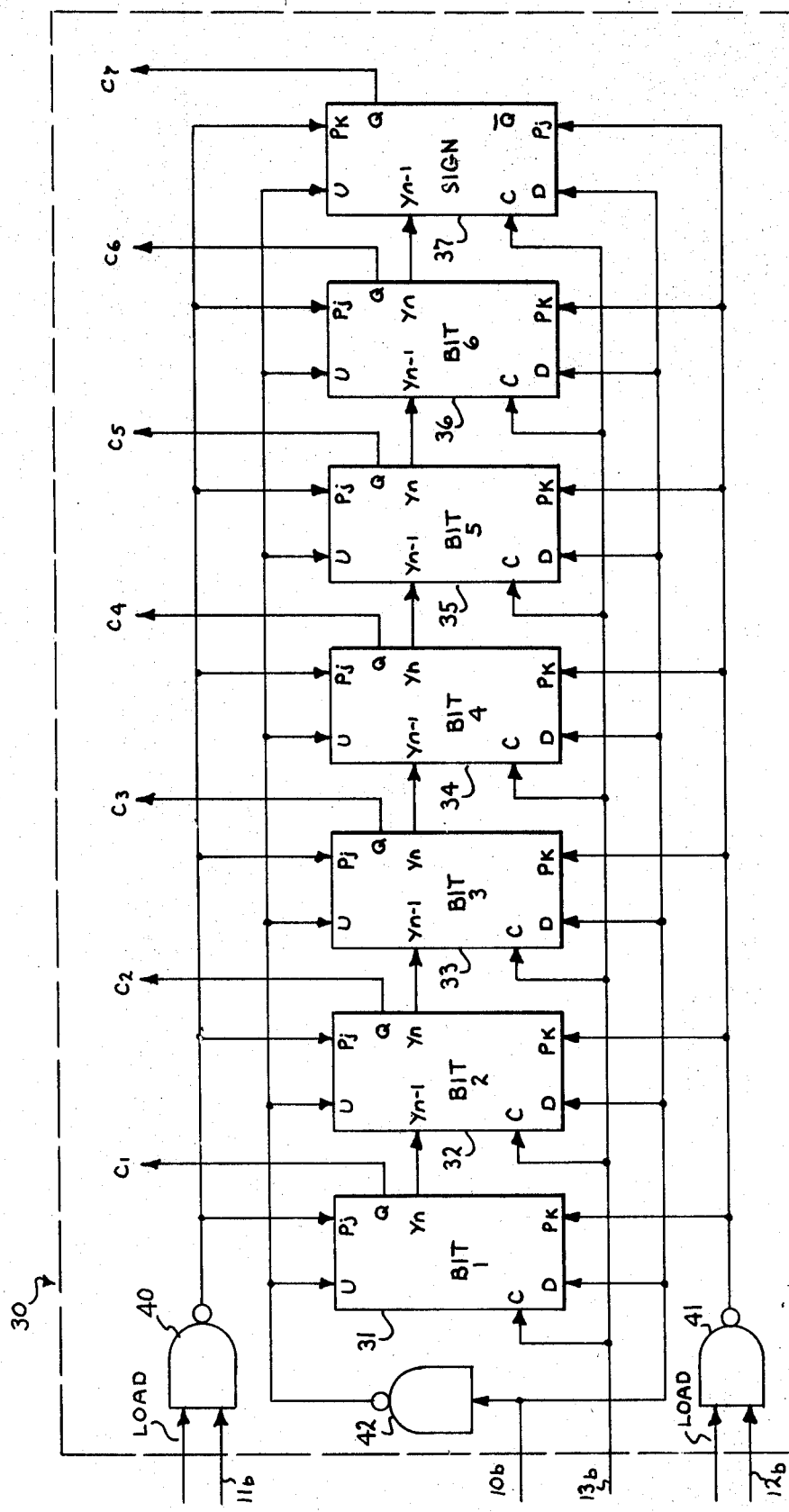
FIG. 4 is a detailed logic diagram of a portion of one of the firing circuits of FIG. 1, including a reversible counter.
Figure 6:
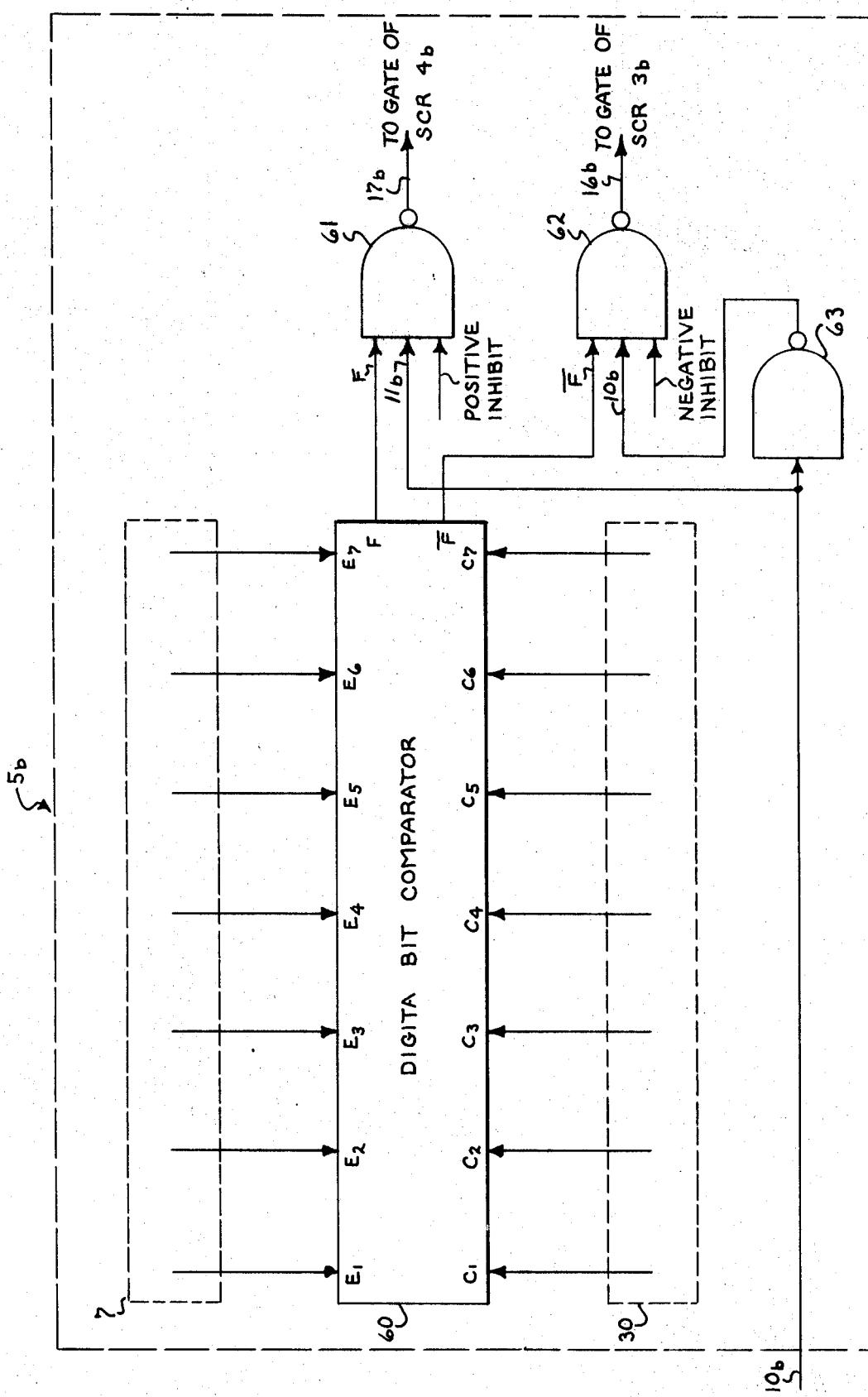
FIG. 6 is a detailed logic diagram of another portion of one of the firing circuits of FIG. 1, including a digital comparator.

Before turning to the detailed logic diagrams of FIGS. 3, 4 and 6, it is necessary to describe the logic elements used therein. Since the present embodiment is a digital system, the apparatus described operates at two logic levels, referred to as logic "0" and logic "1." These logic levels are really ways of identifying a particular voltage level. For example, a logic "1" may be some positive voltage, say +4 volts, whereas logic "0" will be a lower voltage, say 0 volts. It is clear of course, that the particular logic levels form no part of the present invention and are referred to only to assist in the description of the preferred embodiment. In addition, it is also clear that while the preferred embodiment uses NAND logic, any type of logic system, positive or negative, could be used equally well without departing from the spirit of the invention.

In FIG. 4, the logic element denoted with the number 41 is a simple NAND gate. The operation of the gate is such that when *all* of its inputs (denoted by the arrow) are logic "1," the output (denoted by the circle) will be a logic "0." Under *all* other conditions of inputs, the output of gate 41 will be a logic "1." This is true regardless of the number of inputs provided. Thus, if a gate has only a single input (such as NAND gate 42) it operates as a simple inverter since when its single input is a logic "1," its output will be a logic "0." Conversely, if its single input is a logic "0," its output will be a logic "1" so that it functions to invert the sense of a single logic signal at its input.

The logic element in FIG. 3 denoted with the number 20 and labeled "PD" is a phase detector which operates to shape a sinusoidal AC input in a square wave. In its simplest form, the phase detector 20 may comprise, for example, an amplifier and clipper which amplifies the AC input signal and clips it at a certain voltage level compatible with the logic system in which it is used.

The logic symbol in FIG. 3 denoted with the numbers 22 and 23, and labeled "OS" is a simple one-shot multivibrator or univibrator. It operates in response to a signal on its input, denoted by the arrow, to generate a pulse of a predetermined duration on its output. The specific one-shot shown in FIG. 3 operates in the following fashion—when the signal at its input (denoted by the arrow) goes from a logic "1" to a logic "0" a pulse will be generated on the output which goes from logic "1" to logic "0" for a predetermined period of time.

Figure 5:
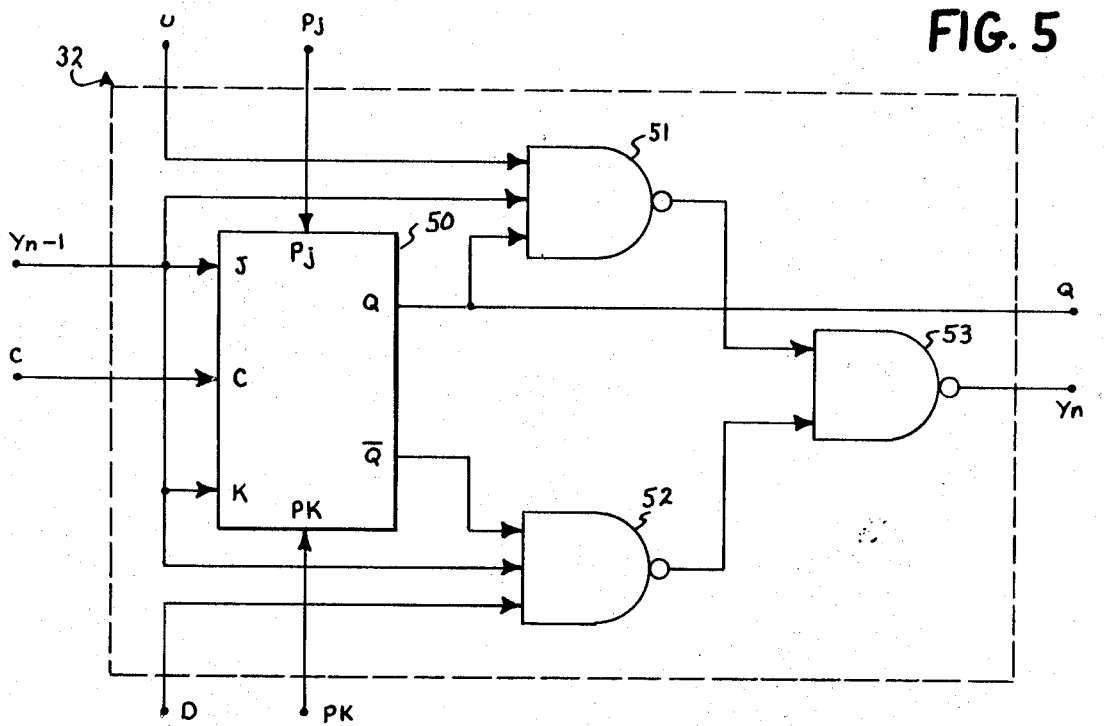
FIG. 5 is a detailed logic diagram for one of the counter units of FIG. 4.

In FIG. 4 which depicts in detail a portion of firing circuit 5b of FIG. 1, the logic element indicated by the number 32 is a reversible counterstage. Operation of the reversible counterstage 32 can best be understood by referring to FIG. 5, which shows the detailed logic diagram thereof. Reversible counterstage 32 comprises a standard J-K flip-flop 50 and three NAND gates 51, 52 and 53. The J-k flip-flop operates in the following well-known fashion. The two inputs labeled Pj and Pk are the direct set and direct reset terminals and operate, if separately energized, such that the application of a logic "0" on the Pj terminal causes the J-K flip-flop 50 to assume the set state. Conversely, under the same conditions the application of a logic "0" to the Pk terminal causes the J-K flip-flop 50 to assume the reset state. The J and K input terminals are the set steering and reset steering terminals, respectively. Finally, the "C" terminal is the trigger or clock terminal. Operation of the J-K flip-flop 50 from the set and reset steering terminals is as follows: a logic "1" at the set steering terminal J, followed by a trigger signal on the clock terminal "C" causes J-K flip-flop 50 to assume the set state. A trigger signal at the clock terminal "C" is defined as a signal going from logic "0" to logic "1." Similarly, a logic "1" at the reset terminal K followed by a trigger at the clock terminal "C" caused the J-K flip-flop 50 to assume the reset state. When a logic "1" exists on both the J and K input terminals as in the present embodiment shown in FIG. 5, the J-K flip-flop 50 will be caused to change state at the next trigger on the clock terminal "C." The output terminals Q and $\overline{Q}$ indicate the state of the J-K flip-flop 50. The Q output terminal will be a logic "1" when the J-K flip-flop 50 is set and the $\overline{Q}$ output terminal will be a logic "1" when the J-K flip-flop 50 is reset.

The combination of J-K flip-flop 50, and NAND gates 51, 52 and 53 forms a single stage of a reversible counter of the nonripple type. That is, when the counter receives an input pulse, all stages of the counter change state simultaneously rather than succeeding stages being activated by changes in preceding stages as is true in a counter of the ripple type. Hence, the counterstage 32 has a first input terminal labeled YN-1 which has the following Boolean characteristic in order to form part of a synchronous-type reversible counter:

$$YN-1 = UP \cdot \underbrace{YN-1 \cdot Q}_{\text{from stage 31}} + DOWN \cdot \underbrace{YN-1 \cdot \overline{Q}}_{\text{from stage 31}}$$
$\underbrace{\phantom{YN-1}}_{\text{input to stage 32}}$ In other words, the input on terminal YN-1 of stage 32 will be a logic "1" if the counter is counting in the up direction *and* all preceding stages are set, *or* if the counter is operating as a down counter *and* all preceding stages are reset. The input terminal labeled "C" is, as previously noted, the clock input terminal.

To determine the direction in which the counter will count, there are provided two additional input terminals labeled U and D which are the up and down count terminals, respectively. In addition, in order to preset the counter to the desired number, there are provided input terminals Pj and Pk which constitute the direct set and reset input terminals, respectively.

The output of each stage of the counter, the signal YN, has the following Boolean characteristic:

$$YN = UP \cdot \underbrace{YN-1 \cdot Q}_{\text{from stage 32}} + DOWN \cdot \underbrace{YN-1 \cdot \overline{Q}}_{\text{from stage 32}}$$

In other words, the signal YN will be a logic "1" if the particular stage and all preceding stages are set when the counter is counting up *or* if the particular stage and all preceding stages are reset when the counter is counting down. The first part of this relationship ($UP \cdot YN-1 \cdot Q$) is accomplished by gate 51 which has as its input the signal U, the signal YN-1 and the Q output of the J-K output 50. If all three of these signals are logic "1" then the output of gate 51 will be a logic "0." Since the output of gate 51 forms one of the inputs to gate 53, the output of gate 53, under these conditions, will be a logic "1." Similarly, the second part of this relationship ($DOWN \cdot YN-1 \cdot \overline{Q}$) is accomplished by gate 52 which has as its inputs the signal D, the signal YN-1, and the $\overline{Q}$ output of J-K flip-flop 50. If all three of these signals are logic "1" then the output of gate 52 will be a logic "0." Since the output of gate 52 forms the second input to gate 53, the output of gate 53 will be a logic "1" whenever the output of gate 52 is a logic "0." The interrelation and operation of the multiple stages of a complete reversible counter will be explained in more detail during the detailed description of the portion of the firing circuit shown in FIG. 4.

FIG. 3 shows a detailed diagram of the phase detection logic 9 of FIG. 1. As is pointed out in the general description of FIG. 1, the purpose of the phase detection logic 9 is to synchronize the control interval with the AC input waveform and to condition the appropriate firing circuit, by means of output signals on terminals 10a, 11a, 12a, etc. The output signals on terminals 10 define the control interval, establish the direction of counting of the reversible counter in the digital firing circuit, and establish whether a positively or negatively poled SCR is to be fired. The output signals on terminals 11 and 12, respectively, determine when the reversible counter is to be preset and whether it is preset to a positive or negative digital number.

Figure 2B:
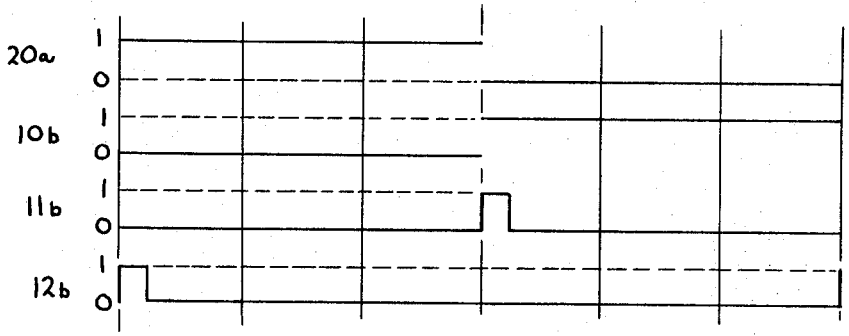

By way of example, it has been shown that the control intervals, for the "B" firing circuit 5b are to begin at 0° and 180°. These particular times happen to be synchronous with the changes in polarity of the "A" phase from the AC source. Hence, phase detection logic 9 will define a change in control interval for the "B" firing circuit 5b whenever the "A" phase changes polarity. This is accomplished by virtue of the phase detector 20a which operates to transform the "A" phase from a sinusoidal to a square wave signal. The output of phase detector 20a is fed to a first one-shot 22a and to a first NAND gate 21a. When the "A" phase changes in polarity from positive to negative, as best illustrated in FIG. 2(b), the output of phase detector 20a changes from a logic "1" to a logic "0." Since the output of phase detector 20a is coupled to the input of one-shot 22a, one-shot 22a will generate an output signal which changes from logic "1" to logic "0" for a predetermined amount of time. The output of one-shot 22a is inverted by a gate 24a whose output accordingly changes from a logic "0" to a logic "1" for the same predetermined amount of time. The output of gate 24a is connected to output terminal 11b of phase detection logic 9.

Likewise, the output of phase detector 20a is coupled to the input of a second one-shot 23a through gate 21a. However, since gate 21a inverts that output, the signal at the input of one-shot 23a will go from a logic "0" to a logic "1" when the "A" phase changes polarity, positive to negative, and, accordingly, one-shot 23a will not produce an output pulse. However, the input of one-shot 23a is connected to output terminal 10b of phase detection logic 9 and it may readily be seen that when the "A" phase is negative in polarity, the signal on the output 10b will be a logic "1."

When the "A" phase again changes in polarity from negative to positive, as also illustrated in FIG. 2(b), the output of phase detector 20a, FIG. 3, changes from a logic "0" to a logic "1." At this time, an output pulse will be generated by one-shot 23a but not by one-shot 22a. The output of one-shot 23a is inverted by a gate 25a connected to output terminal 12b of phase detection logic 9 and will comprise a pulse of logic "1" which exists for a predetermined amount of time. Also, as the output of phase detector 20a is inverted by gate 21a and supplied to output terminal 10b, the signal on output terminal 10b will change at this time to a logic "0."

As can be noted from FIGS. 3, 4 and 6, outputs 10b, 11b and 12b are coupled to the "B" firing circuit 5b. Briefly, they perform the following functions:

1. Output 10b initiates and terminates the control interval of the SCR's 3b and 4b of FIG. 1, associated with the "B" firing circuit, 5b. With reference to FIGS. 2a and 2b, it is to be noted that during the 0° to 180° interval, the "A" phase is positive as shown in FIG. 2a. During this 0° to 180° interval, as shown in FIG. 2b, the output on terminal 10b is a logic "0," and the "B" phase in FIG. 2a changes, at 120°, from negative to positive where it remains until 300°, at which time it returns to negative. Thus, the desired control interval for the negatively poled SCR 3b of FIG. 1 is definable by the wave polarity and polarity changes of the "A" phase shown in FIG. 2a as comprising the interval between 0° and 180°, coincident with the presence of logic "0" on terminal 10b. Similarly, coincidentally with the negative half of the phase "A" wave, terminal 10b output is a logic "1" and both prevail for the interval from 180° to 360° (0°). This is the desired control interval for the positively poled SCR 4b of FIG. 1. The logic sense of output 10b also controls the direction of counting of the reversible counter in the firing circuit 5b. Finally, the logic sense of output 10b determines to which SCR of the pair 3b—4b the firing pulse is to be supplied.

2. The signals on outputs 11b and 12b in FIG. 3 provide pulses which set the reversible counter in firing circuit 5b to either a positive or negative binary-coded digital number. Thus, when the control interval for the negative SCR 3b is initiated by the change of logic sense on output 10b from a logic "1" to a logic "0," the output pulse generated by one-shot 23a and gate 25a appears on terminal 12b and is thereby coupled to firing circuit 5b to preset the reversible counter therein to a predetermined negative digital number. Likewise, when the control interval for the positive SCR 4b is initiated by the output on terminal 10b going from a logic "0" to a logic "1," the pulse produced by one-shot 22a and gate 24a appears on terminal 11b and is thereby coupled to firing circuit 5b to preset the reversible counter therein to a predetermined positive digital number.

The necessary signal to define the remaining control intervals and to condition the other two firing circuits 5a and 5c is produced by the remainder of the logic circuitry shown in FIG. 3. This circuitry is identical in form and operation to that described for controlling the "B" firing circuit 5b and it is denoted with similar numbers, suffixed with the letters a and c.

In order to fully understand the firing circuit shown in FIGS. 4 and 6, it is first necessary to explain the form of the error signal generated by the digital error generator 7. This error signal may be either positive or negative in polarity. The digital error signal of the present embodiment is in pure binary notation, but any code could be used with minor modifications in the logic circuitry. For the purposes of explaining the present embodiment, the digital error signal is assumed to be a six bit pure binary number with a seventh (most significant) bit being used to represent the sign of the error.

For positive errors, the error signal indicates the magnitude of the error in pure binary form with the sign bit being "0" to indicate a positive error.

For negative error signals, the sign bit is a "1" and the magnitude of the error is coded in the so-called two's complement. That is, a negative number is obtained by beginning with a positive number of corresponding magnitude and substituting 1's for 0's for 1's and adding one to the result.

The following examples serve to illustrate the coding of the digital error signal which is used in the present embodiment:

$$+5 = 0000101$$
$$-5 = 1111010$$
$$+1$$
$$\overline{\phantom{1111011}1111011}$$

Referring now to FIG. 4, there is shown a detailed logic diagram of the reversible counter portion of the firing circuit 5b of FIG. 1. Firing circuits 5a, 5b and 5c are identical. In the present embodiment, the desired firing angle is directly proportional to the magnitude of the digital error signal. Thus, an error signal of maximum magnitude should result in firing the SCR's at the earliest possible time, i.e., 120° prior to a change in the polarity of the AC waveform. Briefly, this is accomplished by loading a preset digital number having a magnitude equal t the maximum expected error signal into a reversible counter 30 composed of counter stages 31–37 and gates 40–42 at the beginning of the control interval.

The contents of the reversible counter 30 is then counted at a predetermined rate until a predetermined relation between the error signal and the contents of the reversible counter 30 undergoes a change, such as a change in the sign of the difference therebetween, at which time a firing pulse is generated. When the phase detection logic 9 indicates that the positive polarity controllable rectifier 4b should be fired, a positive digital number is preset into the reversible counter 30 and thereafter the contents of the reversible counter 30 is counted down from that positive number. On the other hand, if the phase detection logic 9 indicates that the negative polarity SCR 3b should be fired, a negative digital number is preset into the reversible counter 30 and thereafter the contents of the reversible counter 30 is counted up.

More specifically, the operation is initiated and the control interval established by a change in logic state of the phase detection logic 9 output on terminal 10b. As heretofore explained, the signal on terminal 10b will be a logic "1" throughout the desired control interval for the positively poled SCR 4b. Terminal 10b is connected directly to the D input terminals of the counter stages 31–37 so that counter 30 will count down from its preset number at a rate determined by the clock pulses present on input terminal 13b and coupled to clock terminals "C" of counter stages 31–37.

At the same time as the change in logic sense of the output signal on terminal 10b is commanding the counter 30 to count in a predetermined direction, the existence of an output pulse on either terminal 11b or 12b acts to preset either a positive or negative digital number into the counter 30. When it is desired to control the positive SCR 4b, as noted heretofore, an output pulse of logic "1" will be present on terminal 11b. This output pulse is coupled to one input of a NAND gate 40 whose other input is supplied with a LOAD signal whose state is always a logic "1." Upon the coincidence of the LOAD signal and the output pulse on terminal 11b, a logic "0" is generated at the output of gate 40 which is coupled to set terminals Pj of counter stages 31–36. By application of a logic "0" to these terminals, the signal on outputs "Q" of counter stages 31–36 goes to a logic "1." Additionally, the output of NAND gate 40 is coupled to reset terminal Pk of counter stage 37. The sign bit of the digital number contained in reversible counter 30 is represented by counter stage 37 and accordingly, when a positive number is to be preset into the counter 30, application of a logic "0" to reset terminal Pk of counter stage 37 changes the output on terminal "Q" thereof to a logic "0." Therefore, at the beginning of the control interval for the positive SCR 4b, counter 30 contains the positive digital number 01111111.

Throughout the remainder of the control interval, counter 30 counts down from that preset number at a rate determined by the clock pulses applied from terminal 13b to the clock terminals "C" of counter stages 31–37. To determine the frequency of clock generator 13, one need consider the frequency of the AC input, the number of stages in counter 30, the duration of the control interval and the degree of "hardening." The last mentioned quantity relates to firing of the appropriate SCR before the zero crossover point of the waveform thereacross with a zero error signal being applied from digital error generator 7. Of course, it may be desired to fire the SCR at the zero crossover point, or well into the 60° portion of the AC waveform, and thus the following calculation using "hardening" is merely illustrative.

If it is assumed that the frequency of the AC line is 60 Hz.; that each control interval is 180°, as noted above; that the degree of hardening required is 15°; that there are six counter stages, and that the earliest SCR firing is 120° advanced, the counting rate should be equal to $$60 \frac{\text{cycle}}{\text{sec.}} \times \frac{360°}{\text{cycle}} \times \frac{(2^6-1) \text{ counts}}{(120-15)°}, \text{ or } 13 \text{ KHz.}$$

When conduction of the negative SCR 3b is desired, the definition of the control interval proceeds in a manner similar to that for the positive SCR 4b, with the exception that a preset pulse of logic "1" is provided on terminal 13b which, together with LOAD signal, is applied to a second NAND gate 4. Upon this coincidence, a logic "0" generated at the output of gate 41 which is coupled to reset terminals Pk of counter stages 31–36 to change the output signal thereof, as represented at terminals "Q, to a logic "0." Likewise, the connection of the logic "0" output of the NAND gate 41 to set terminal Pj of counter stage 37 changes the output signal sign or most significant bit on terminal "Q" of stage 37 to a logic "1," thus counter 30 is preset at the beginning of the control interval for the negative SCR 3b to the negative digital number 1000000.

Counter 30 is then commanded to count up from that negative preset number by the application of a logic "1" to terminals "U" of stages 31–37, the logic "1" signal being obtained by inverting, by means of gate 42, the logic "0" signal present on terminal, 10b throughout the negative control interval.

The contents of reversible counter 30 is continuously monitored on output terminals C1 to C7 thereof which are supplied to corresponding input terminals of a digital bit comparator 60 best illustrated in FIG. 6. In the specific embodiment shown in FIG. 6, digital bit comparator 60 has two outputs labeled F and $\overline{F}$ which indicate when a predetermined relation between the digital error signal applied to inputs E1 to E7 of digital bit comparator 60 and the contents of the reversible counter 30, as represented by inputs C1–C7, changes. The comparator may be chosen so that the outputs F and $\overline{F}$ represent the direction of sign change of the difference between the error signal and the contents of the reversible counter. Thus, when the reversible counter 30 is set to a positive digital number, and the error signal is a lower valued positive digital number, the aforementioned condition is met when the sign of the difference comparison goes from negative to positive, and a logic "1" will be produced on output terminal F. On the other hand, when the reversible counter 30 is preset to a negative digital number, the aforementioned condition is met when the sign of the difference comparison goes from positive to negative, and a logic "1" will be produced on output terminal $\overline{F}$.

No particular type of comparator is required in order to accomplish this function. Bit comparators, having these characteristics, are well known to the art. As is pointed out in R. Richard "Arithmetic Operation in Digital Computers" at 290 (Von Nostrand 1955) a simple way of comparing two binary numbers is to subtract one from the other and sense the sign of the difference. Hence, the bit comparator 60 could comprise, for example, a portion of a parallel subtractor which acts to subtract the contents of the reversible counter 30 from the contents of the register or counter in error generator 7 an then generate the aforementioned output signals F and $\overline{F}$ which are indicative of the sign of the difference. However, the invention is not to be construed to be limited to a bit comparator of his type, and it is only required that the comparator be able to detect a condition when a predetermined relation between the error signal and the contents of the reversible counter 30 changes.

In order to fire the appropriate SCR 3b or 4b, it is necessary that the logic output of bit comparator 60 be directed thereto. For this purpose, NAND gates 61 and 62 are provided. NAND gate 61 has as its inputs the output "F" from the comparator 60, the signal on terminal 10b, and a positive inhibit signal to be hereinafter described. As was noted in the discussion of the phase detection logic 9, the signal on terminal 10b performs a number of functions, one of those being selection of the SCR which is to be fired by a firing pulse from the circuit 5b during the appropriate control interval. Supplying the signal on terminal 10b to gate 61 accomplishes this function. From FIG. 2b, the signal on terminal 10b is a logic "1" during the control interval for the positively poled SCR 4b. Assuming that the positive inhibit signal is also a logic "1," upon a comparison output on terminal "F" of bit comparator 60, a logic "0" output will be generated by NAND gate 61 which may be suitably inverted and amplified by means not shown and applied to the gate of SCR 4b. Since one of the inputs to NAND gate 61 is provided by the "F" output from bit comparator 60, the firing pulse can be generated only when a positive number has been preset into reversible counter 30 and the error signal has become, by virtue of counting down reversible counter 30 contents throughout the control interval, greater than the contents of reversible counter 30.

Firing of the negatively poled SCR 3b is accomplished by means of gate 62 which has its input the $\overline{F}$ output from bit comparator 60, a negative inhibit signal to be hereinafter described, a signal $\overline{10b}$ which is obtained by an inverter 63 having as its input the signal on terminal 10b. With reference again to FIG. 2b, during the control interval for the negative SCR 3b, the signal on terminal 10b will be a logic "0." By suitable inversion, signal $\overline{10b}$ will be a logic "1." Assuming that the negative inhibit signal is also a logic "1," if the signal $\overline{F}$ becomes logic "1" during the control interval, a logic "0" output is generated by gate 62 which may be suitably inverted and amplified and applied to the gate of SCR 3b. As noted, the logic "1" output will be present on terminal $\overline{F}$ only when a negative number has been preset into reversible counter 30 and reversible counter 30 is counted up throughout the control interval so that the contents of reversible counter 30 become equal to or greater than the error signal.

The positive and negative inhibit signals may be used to eliminate or reduce erratic firing of the SCR's 3b and 4b by digital noise signals caused during the aforementioned logic operations. For instance, the positive and negative inhibit signals may be dependent on a lock lockout circuit responsive to current flowing through the load. For example, to avoid crossfire problems, it is desired to prevent the positive SCR's from conducting when current is flowing in a negative direction through the load. Likewise, the positive or negative inhibit signals may prevent firing when the preset numbers, either positive or negative, are loaded into the reversible counters, and also when a similar loading is made within digital error generator 7. During each of these conditions when it is desired that the positive or negative SCR's not be fired, the positive or negative inhibit signals will be a logic "0."

The firing circuits 5a and 5c are identical to firing circuit 5b and operate in a similar manner during the control intervals established by phase detection logic 9. It will be recognized that in the three-phase system described in the preferred embodiment, the digital error signal is being simultaneously and continuously compared with the contents of each firing circuit's reversible counter. However, since the counting rate is constant, the aforementioned change in relation between the error signal and the contents of the reversible counters occurs at different times so that the SCR's are fired in a proper phase sequence.

Because of the continuous comparison in each firing circuit's comparator, the firing technique of this invention is particularly suitable for use in situations where dynamic changes within the control interval are expected in the digital error signal. One such application would be the velocity loop of a digital servosystem. Also, by detecting the sign change of the difference between the error signal and the reversible counter contents, a firing pulse may be reliably generated under such highly transient conditions, which may not be the case were the firing pulse to be generated only upon strict equality of those quantities.

Although the invention has been described with respect to a particular embodiment, the principles underlining this invention will suggest many additional modifications of this particular embodiment to those skilled in the art. For example, it is not necessary that a separate reversible counter and digital comparator be used for each phase of voltage supplied to the load. A pair of counters and comparators can be used, one a forward counter used, say, for controlling the firing of the positive polarity controllable rectifiers and another, a reverse counter, used for controlling the firing of the negative polarity controllable rectifiers. With this arrangement, the controllable rectifiers can each only be fired over a 120° interval, say from 90° advanced to 30° retarded.

Also, it is not necessary to preset the reversible counters to their most positive or negative numbers, if different coding of the error signal is used or if a different scheme of control during the control interval is desired.

Those skilled in the art will recognize that this invention may be used to provide full wave-rectified power to a load such as a dynamoelectric machine. In this event, additional controlled rectifiers, firing circuits, etc., would be required to complete such a system.

While this invention has been described with respect to a preferred embodiment, it is to be clearly understood by those skilled in the art that the invention is not limited thereto, but rather shall cover all such modifications as fall within the true spirit and scope thereof and is intended to be bounded only by the limits of the appended claims.

What is claimed as new and desired to be secured by Letters Patent of the United States is:

1. In a digital control system for controlling the flow of power from an AC source to a load comprising in combination controllable rectifiers poled in opposite directions, connected between the AC source and the load, a digital error generator, phase detection logic means operatively connected to the AC source, an output of said phase detection logic means occurring at the earliest point in each half cycle of the AC wave at which one of said controllable rectifiers is permitted to conduct, and a clock generator, an improved firing circuit including:

a. a counter operatively connected to said clock generator and to said phase detection logic means, to cause a predetermined digital number to be preset into said counter upon the occurrence of an output signal from said phase detection logic means, said counter contents thereafter being counted by said clock generator; and b. comparison means operative connected to said counter and to said digital error generator, said comparison means being operative to generate an output when a predetermined relation between the contents of said digital error generator and the contents of said counter changes, said output resulting in the generation of a firing pulse for a selected one of said controllable rectifiers.

2. A digital firing circuit as recited in claim 1 wherein said counter is a reversible counter which counts in one direction when an AC source voltage is positive in polarity and in the other direction when said AC source voltage is negative in polarity.

3. The digital firing circuit as recited in claim 1 wherein said counter is a reversible counter adapted to count down when the AC source voltage is positive in polarity and to count up when the AC source voltage is negative in polarity, and where said predetermined digital number is positive when the AC source voltage is positive and negative when the AC source voltage is negative.

4. The digital firing circuit as recited in claim 2 wherein said change in predetermined relation sensed by said comparison means is a change in the sign of the difference between the contents of said digital error generator and the contents of said counter.

5. The digital firing circuit as recited in claim 4 wherein said comparison means produces a firing pulse for said positively poled controlled rectifier when the contents of said digital error generator exceed the contents of said reversible counter, and produces a firing pulse for said negatively poled controlled rectifier when the contents of said reversible counter are greater than or equal to the contents of said digital error generator.

6. The digital firing circuit as recited in claim 1 wherein the combination includes a dynamoelectric machine as a load.

7. A digital firing circuit as recited in claim 1 wherein said phase detection logic means operates to initiate possible conduction during at last 120° of each half cycle of the AC input and continuing through the first 60° of the following half cycle.

8. A method for controlling the transfer of power from an AC source to a load comprising the steps of:

a. generating an error signal in digital form;
b. sensing the AC source and generating a signal at the first point in each half cycle at which power is permitted to be transferred to the load, said signal thereafter defining the interval in which said power transfer may take place;
c. presetting a predetermined digital number into a counter in response to the signal of step (b);
d. counting the contents of a counter at a predetermined rate;
e. comparing the contents of the counter with the digital error signal, and sensing when a predetermined relation therebetween changes; and
f. firing a controllable rectifier connected between the AC source and the load.

9. The method set forth in claim 8 wherein the signal of step (b) presets a predetermined digital number of given polarity into the counter and thereafter controls the direction of counting thereof.

10. The method as set forth in claim 8 wherein step (b) comprises generating a signal at 120° advance during each half cycle.

11. In a digital firing circuit operative to fire either polarity of oppositely poled controllable rectifiers connected between an AC source and a load in response to a digital error signal, the improvement comprising:

a. A digital counter arranged to count at a predetermined rate;
b. phase detection logic means for sensing the earliest point in each half cycle of the AC wave at which a firing pulse can be generated, the output of said phase detection logic means being operatively connected in said digital firing circuit to define a control interval in which a predetermined digital number is preset into said digital counter, said digital counter thereafter counting in a predetermined direction from said preset number; and c. a digital comparator having operatively connected thereto the digital error signal and the contents of said digital counter, said digital comparator being operative to produce an output signal whenever the sign of the difference between the digital error signal and the contents of said digital counter changes, said output being relayed to fire one of the controllable rectifiers.

12. The improved digital firing circuit as recited in claim 11 wherein said digital counter comprises a reversible counter which counts in one direction when an AC source voltage which is positive in polarity and which counts in the other direction when an AC source voltage is negative in polarity.

13. The improved digital firing circuit as recited in claim 12 wherein said reversible counter is preset by the signal from said phase detection logic means to a positive digital number when an AC source voltage is positive in polarity, the reversible counter thereafter counting down from the positive preset number, and wherein the signal from said phase detection logic means presets a negative digital number into said reversible counter when said AC source voltage is negative in polarity, the reversible counter thereafter counting up from the negative preset number.

14. The digital firing circuit recited in claim 11 wherein said phase detection logic means operates to define a control interval starting 120 advanced for each polarity of the AC input.

15. The improved digital firing circuit recited in claim 11 wherein the combination includes a dynamoelectric machine as a load.

16. A closed loop, speed-regulated, reversing motor control system comprising drive motor means; oppositively poled controllable rectifier means in each line of miltiphase AC source for coupling electrical energy therefrom to said drive motor; the improvement comprising digital circuit means for synchronizing the generation of firing pulses for said controllable rectifier means with the corresponding phase and polarity of the AC source; the firing pulses controlling the passage of electrical energy through said controllable rectifiers to said motor in accordance with an error signal derived from a comparison of digital command signals with digital feedback signals; the command signal representing desired motor performance and the feedback signal indicating actual motor performance, said digital circuit means comprising, in combination:

a. a pulse generator driven by said motor at a speed representative of said motor speed and having an output of at least one pulse per revolution;

b. a digital command generator for providing the command signal;

c. a digital error generator, means for electrically coupling said pulse generator, wherein a comparison of the output of said pulse generator with the command signal results in an error signal;

d. phase detection logic means coupled to the AC source to sense the polarity of each phase of the source voltage and having an output which presets a predetermined digital number into digitally operated firing circuits at the earliest point in each half cycle of the source voltage at which firing pulses may be generated for controlled rectifiers of corresponding phases;

e. a digitally operated firing circuit per phase of the input power operatively connected to said phase detection means and to said digital error generator, each of said firing circuits comprising a digital comparator and a reversible digital counter arranged to count in a predetermined direction from the predetermined digital number preset thereinto by said phase detection logic means, said firing circuit providing firing pulses to appropriately poled corresponding controllable rectifiers when said digital comparator detects a change in sign of the difference existing between the contents of said digital counter and the digital error signal; and f. a clock generator operatively connected to said digital counters in said firing circuits, said clock generator operating at a fixed frequency to count the contents of said digital counter from the predetermined digital number.

PO-1050
(5/69)

United States Patent Office
CERTIFICATE OF CORRECTION

Patent No. 3,601,674    Dated Aug. 24, 1971

Inventor(s) John A. Joslyn and Albert F. Koch

It is certified that error appears in the above-identified patent and that said Letters Patent are hereby corrected as shown below:

In the title -- DIGITAL -- should be inserted before "CONTROL" so that the title reads:

DIGITAL CONTROL SYSTEM FOR FIRING SCR'S IN POWER
    CONVERSION APPARATUS

Column 14, line 13 -- generator and said digital command generator to said digital error -- should be inserted between "pulse" and "generator," so that this line reads as follows:

said pulse generator and said digital command
    generator to said digital error generator, wherein
    a comparison of the output Signed and sealed this 29th day of February 1972.

(SEAL)
Attest:

EDWARD M. FLETCHER, JR.          ROBERT GOTTSCHALK
Attesting Officer                Commissioner of Patents